US 11,297,012 B2

(12) United States Patent
Musoll (10) Patent No.: US 11,297,012 B2
(45) Date of Patent: *Apr. 5, 2022

(54) PACKET PROCESSING SYSTEM, METHOD AND DEVICE HAVING REDUCED STATIC POWER CONSUMPTION

(71) Applicant: Cavium, LLC, Santa Clara, CA (US)

(72) Inventor: Enrique Musoll, San Jose, CA (US)

(73) Assignee: Marvell Asia PTE, LTD., Singapore (SG)

( * ) Notice: Subject to any disclaimer, the term of this patent is extended or adjusted under 35 U.S.C. 154(b) by 73 days.

This patent is subject to a terminal disclaimer.

(21) Appl. No.: 16/803,855

(22) Filed: Feb. 27, 2020

(65) Prior Publication Data
US 2020/0204504 A1 Jun. 25, 2020

Related U.S. Application Data

(63) Continuation of application No. 14/673,819, filed on Mar. 30, 2015, now Pat. No. 10,616,144.

(51) Int. Cl.
| | | |
|---|---|---|
| *H04L 12/861* | (2013.01) | |
| *H04L 29/08* | (2006.01) | |
| *H04L 12/70* | (2013.01) | |
| *H04L 49/9047* | (2022.01) | |
| *H04L 67/1008* | (2022.01) | |
| *H04L 67/1004* | (2022.01) | |

(52) U.S. Cl.
CPC .... *H04L 49/9047* (2013.01); *H04L 29/08171* (2013.01); *H04L 29/08153* (2013.01); *H04L 67/1008* (2013.01); *H04L 2012/5631* (2013.01)

(58) Field of Classification Search
CPC ............ H04L 12/2869; H04L 29/8171; H04L 67/1008
See application file for complete search history.

(56) References Cited

U.S. PATENT DOCUMENTS

| | | | | |
|---|---|---|---|---|
| 5,721,858 A | * | 2/1998 | White | ................ G06F 12/1036 711/200 |
| 9,379,963 B2 | | 6/2016 | Tran | |
| 2002/0007277 A1 | * | 1/2002 | Besana | .................... G11C 7/16 704/270 |
| 2004/0236897 A1 | | 11/2004 | Cheng | |

(Continued)

FOREIGN PATENT DOCUMENTS

| | | |
|---|---|---|
| CN | 1795437 A | 6/2006 |
| CN | 103064796 A | 4/2013 |

(Continued)

OTHER PUBLICATIONS

Notice of Allowance dated Aug. 28, 2020 for the Chinese Patent Application No. 20168001150839.

(Continued)

*Primary Examiner* — Getente A Yimer (57) ABSTRACT

A buffer logic unit of a packet processing device including a power gate controller. The buffer logic unit for organizing and/or allocating available pages to packets for storing the packet data based on which of a plurality of separately accessible physical memories that pages are associated with. As a result, the power gate controller is able to more efficiently cut off power from one or more of the physical memories.

49 Claims, 6 Drawing Sheets

(56) References Cited

U.S. PATENT DOCUMENTS

| | | |
|---|---|---|
| 2005/0076228 A1 | 4/2005 | Davis et al. |
| 2005/0193240 A1 | 9/2005 | Ash |
| 2010/0259536 A1 | 10/2010 | Toksvig et al. |
| 2012/0254579 A1* | 10/2012 | Schroeder ............ G06F 3/0619 |
| | | 711/171 |
| 2012/0311197 A1* | 12/2012 | Larson .................... G11C 7/10 |
| | | 710/22 |
| 2013/0290752 A1* | 10/2013 | Jones .................... G06F 1/3275 |
| | | 713/320 |
| 2014/0153443 A1* | 6/2014 | Carter .................... H04L 45/54 |
| | | 370/256 |
| 2014/0369363 A1 | 12/2014 | Hutchison |
| 2015/0172189 A1 | 6/2015 | Pitchai |
| 2015/0187419 A1 | 7/2015 | Tran |
| 2016/0028623 A1 | 1/2016 | Kamath |

FOREIGN PATENT DOCUMENTS

| | | |
|---|---|---|
| CN | 103177772 A | 6/2013 |
| CN | 103268267 A | 8/2013 |
| CN | 103347013 A | 10/2013 |
| CN | 103856405 A | 6/2014 |
| CN | 103959302 A | 7/2014 |
| CN | 104010049 A | 8/2014 |
| CN | 104012063 A | 8/2014 |

OTHER PUBLICATIONS

Chinese Office Action dated Mar. 18, 2020 for the Chinese Patent Application No. 201680015083.9.
Office Action dated Jul. 31, 2020 from Chinese Patent Application No. 201610188963.8.

* cited by examiner

PACKET PROCESSING SYSTEM, METHOD AND DEVICE HAVING REDUCED STATIC POWER CONSUMPTION

RELATED APPLICATIONS

This application is a continuation of U.S. application Ser. No. 14/673,819, filed on Mar. 30, 2015, and entitled "A PACKET PROCESSING SYSTEM, METHOD AND DEVICE HAVING REDUCED STATIC POWER CONSUMPTION," which is hereby incorporated by reference.

FIELD OF INVENTION

The present invention relates to a packet processing system. More particularly, the present invention relates to reducing static power consumption in a packet processing system.

BACKGROUND OF THE INVENTION

A packet-processing device, like a switch microchip, usually needs to buffer the packets into a packet memory (PM) having one or more banks while the device processes them. The current solution to store the packet in the device's packet memory is to assign multiple chunks (called pages) of packet memory to each packet, rather than a single big chunk. With this scheme, the packet is not stored consecutively in the banks of the packet memory, but rather scattered in one or more pages that together form a link list of pages that map throughout multiple banks of the packet memory. Further, a plurality of these banks (and the pages that map to them) are able to be logically grouped into pools (of banks and the associated pages). Therefore, the linked list of all the pages that a particular packet uses in the packet buffer needs to be maintained in the switch (in the buffer manager or BM); this linked list is traversed when the packet is read out of the packet buffer for transmission. Each page has associated a state that contains some information about the page.

The state of all the pages in the packet processor device is maintained in the switch. A packet has associated a descriptor or token that among other fields contains the pointer to the first page. With this initial pointer, all the pages used by the packet can be retrieved in the same order they were used to store the incoming packet by traversing the link list built with the next-page pointers of the different page states. As a result, a linked list of all the pages (and therefore banks) that a particular packet uses is maintained in the switch and is then traversed to locate and read out the packet from the packet memory for transmission.

BRIEF SUMMARY OF THE INVENTION

A buffer logic unit of a packet processing device includes a power gate controller. The buffer logic unit for organizing and/or allocating available pages to packets for storing the packet data based on which of a plurality of separately accessible physical memories that pages are associated with. As a result, the power gate controller is able to more efficiently cut off power from one or more of the physical memories thereby reducing static power consumption.

A first aspect is directed to a packet processing system. The system comprises a non-transitory computer-readable packet memory comprising a plurality of physical memory units logically divided into one or more pools and able to be independently read from or written to, wherein each of the pools is divided into a plurality of pages such that each of the pages define a separate portion of the physical memory units of the pool, a non-transitory computer-readable buffer memory comprising a separate page buffer for each of the pools, wherein each of the page buffers is filled with one or more of the pages of the associated pool and a buffer memory logic coupled with the buffer memory, wherein for each portion of packet data that needs to be stored, the buffer memory logic is configured to allocate the page that was last added within one of the page buffers to store the portion of the packet data, remove the allocated page from the one of the page buffers while the portion of the packet data is stored on the portion of the physical memory units defined by the allocated page and add the allocated page back into the one of the page buffers when the portion of the packet data is no longer stored on the physical memory units defined by the allocated page. In some embodiments, packet data of incoming packets is stored on the physical memory units at the separate portions of the memory units based on the pages. In some embodiments, the buffer memory logic initially fills each of the page buffers with all of the pages of the associated pool such that the pages are grouped according to which of the physical memory units that the pages define the portion of. In some embodiments, the system further comprises a power gate controller coupled with the buffer memory and each of the physical memory units, wherein the power gate controller is configured to cut power to one or more of the physical memory units at times when all of the pages defining the portions of the one or more of the physical memory units are currently unallocated. In some embodiments, the buffer memory comprises a separate page state table for each of the page buffers such that each of the page state tables is paired with a different one of the page buffers and for each of the pair, each entry of each of the state tables is associated with a different page of the pages of the page buffer that is paired with the state table of the entry and page state data of each of the allocated pages is stored in the entry associated with the page until the allocated page is no longer allocated. In some embodiments, the pages that define portions of the same physical memory unit form a set, wherein the entries that are associated with those pages form a group, wherein each of the groups of entries of each of the state tables are stored on separate clusters of one or more additional physical memory units of the buffer memory, and further wherein the power gate controller is configured to cut power to one or more of the clusters of the additional physical memory units at times when the sets of pages associated with the groups of the entries stored on the one or more of the clusters are unallocated. In some embodiments, the buffer memory comprises a counter for each of the sets of pages, wherein the counter indicates a number of the pages of the set that are currently allocated. In some embodiments, the page state data comprises one or more of a pointer to a next page used to store a packet, a start of the packet indicator, an end of the packet indicator, a byte count, errors incurred and a number of references. In some embodiments, each of the pools comprise a plurality of memory banks.

A second aspect is directed to a packet processing system. The system comprises a non-transitory computer-readable packet memory comprising a plurality of physical memory units logically divided into one or more pools and able to be independently read from or written to, wherein the physical memory units of each of the pool are ranked within a memory ranking respect to each other, wherein each of the pools is divided into a plurality of pages such that each of the pages define a separate portion of the physical memory units of the pool, a non-transitory computer-readable buffer memory comprising a separate page buffer for each of the pools, wherein each of the page buffers is filled with one or more of the pages of the associated pool and a buffer memory logic coupled with the buffer memory, wherein for each portion of packet data that needs to be stored, the buffer memory logic is configured to select one of the pools, determine a number of the physical memory units of the selected pool that include a portion that is defined by at least one unallocated page of the pages of the page buffer associated with the selected pool, determine which of the number of physical memory unit is ranked highest within the memory ranking for the selected pool, allocate one of the at least one unallocated page of the physical memory unit that is ranked highest to store the portion of the packet data, remove the allocated page from the one of the page buffers while the portion of the packet data is stored on the portion of the physical memory unit that is ranked highest defined by the allocated page and add the allocated page back into the one of the page buffers when the portion of the packet data is no longer stored on the portion of the physical memory unit that is ranked highest defined by the allocated page. In some embodiments, packet data of incoming packets is stored on the physical memory units at the separate portions of the memory units based on the pages. In some embodiments, the system further comprises a power gate controller coupled with the buffer memory and each of the physical memory units, wherein the power gate controller is configured to cut power to one or more of the physical memory units at times when all of the pages defining the portions of the one or more of the physical memory units are currently unallocated. In some embodiments, the buffer memory comprises a separate page state table for each of the page buffers such that each of the page state tables is paired with a different one of the page buffers and for each of the pair, each entry of each of the state tables is associated with a different page of the pages of the page buffer that is paired with the state table of the entry and page state data of each of the allocated pages is stored in the entry associated with the page until the allocated page is no longer allocated. In some embodiments, the pages that define portions of the same physical memory unit form a set, wherein the entries that are associated with those pages form a group, wherein each of the groups of entries of each of the state tables are stored on separate clusters of one or more additional physical memory units of the buffer memory, and further wherein the power gate controller is configured to cut power to one or more of the clusters of the additional physical memory units at times when the sets of pages associated with the groups of the entries stored on the one or more of the clusters are unallocated. In some embodiments, the buffer memory comprising a counter for each of the sets of pages, wherein the counter indicates a number of the pages of the set that are currently allocated. In some embodiments, the page state data comprises one or more of a pointer to a next page used to store a packet, a start of the packet indicator, an end of the packet indicator, a byte count, errors incurred and a number of references. In some embodiments, each of the pools comprise a plurality of memory banks.

A third aspect is directed to a buffer logic unit stored on a non-transitory computer-readable medium, the non-transitory computer-readable comprising a plurality of physical memory units logically divided into one or more pools and able to be independently read from or written to, wherein each of the pools is divided into a plurality of pages such that each of the pages define a separate portion of the physical memory units of the pool, and a buffer memory comprising a separate page buffer for each of the pools, wherein each of the page buffers is filled with one or more of the pages of the associated pool, the buffer logic unit coupled with the buffer memory, wherein for each portion of packet data that needs to be stored, the buffer memory logic is configured to allocate the page that was last added within one of the page buffers to store the portion of the packet data, remove the allocated page from the one of the page buffers while the portion of the packet data is stored on the portion of the physical memory units defined by the allocated page and add the allocated page back into the one of the page buffers when the portion of the packet data is no longer stored on the physical memory units defined by the allocated page. In some embodiments, packet data of incoming packets is stored on the physical memory units at the separate portions of the memory units based on the pages. In some embodiments, the buffer memory logic initially fills each of the page buffers with all of the pages of the associated pool such that the pages are grouped according to which of the physical memory units that the pages define the portion of. In some embodiments, the buffer logic further comprises a power gate controller coupled with the buffer memory and each of the physical memory units, wherein the power gate controller is configured to cut power to one or more of the physical memory units at times when all of the pages defining the portions of the one or more of the physical memory units are currently unallocated. In some embodiments, the buffer memory comprises a separate page state table for each of the page buffers such that each of the page state tables is paired with a different one of the page buffers and for each of the pair, each entry of each of the state tables is associated with a different page of the pages of the page buffer that is paired with the state table of the entry and page state data of each of the allocated pages is stored in the entry associated with the page until the allocated page is no longer allocated. In some embodiments, the pages that define portions of the same physical memory unit form a set, wherein the entries that are associated with those pages form a group, wherein each of the groups of entries of each of the state tables are stored on separate clusters of one or more additional physical memory units of the buffer memory, and further wherein the power gate controller is configured to cut power to one or more of the clusters of the additional physical memory units at times when the sets of pages associated with the groups of the entries stored on the one or more of the clusters are unallocated. In some embodiments, the buffer memory comprises a counter for each of the sets of pages, wherein the counter indicates a number of the pages of the set that are currently allocated. In some embodiments, the page state data comprises one or more of a pointer to a next page used to store a packet, a start of the packet indicator, an end of the packet indicator, a byte count, errors incurred and a number of references. In some embodiments, each of the pools comprise a plurality of memory banks.

A fourth aspect is directed to a buffer logic unit stored on a non-transitory computer-readable medium, the non-transitory computer-readable comprising a plurality of physical memory units logically divided into one or more pools and able to be independently read from or written to, wherein the physical memory units of each of the pool are ranked within a memory ranking respect to each other, wherein each of the pools is divided into a plurality of pages such that each of the pages define a separate portion of the physical memory units of the pool, and a buffer memory comprising a separate page buffer for each of the pools, wherein each of the page buffers is filled with one or more of the pages of the associated pool, the buffer logic unit coupled with the buffer memory, wherein for each portion of packet data that needs to be stored, the buffer logic is configured to select one of the pools, determine a number of the physical memory units of the selected pool that include a portion that is defined by at least one unallocated page of the pages of the page buffer associated with the selected pool, determine which of the number of physical memory unit is ranked highest within the memory ranking for the selected pool, allocate one of the at least one unallocated page of the physical memory unit that is ranked highest to store the portion of the packet data, remove the allocated page from the one of the page buffers while the portion of the packet data is stored on the portion of the physical memory unit that is ranked highest defined by the allocated page and add the allocated page back into the one of the page buffers when the portion of the packet data is no longer stored on the portion of the physical memory unit that is ranked highest defined by the allocated page. In some embodiments, packet data of incoming packets is stored on the physical memory units at the separate portions of the memory units based on the pages. In some embodiments, the buffer logic unit further comprises a power gate controller coupled with the buffer memory and each of the physical memory units, wherein the power gate controller is configured to cut power to one or more of the physical memory units at times when all of the pages defining the portions of the one or more of the physical memory units are currently unallocated. In some embodiments, the buffer memory comprises a separate page state table for each of the page buffers such that each of the page state tables is paired with a different one of the page buffers and for each of the pair, each entry of each of the state tables is associated with a different page of the pages of the page buffer that is paired with the state table of the entry and page state data of each of the allocated pages is stored in the entry associated with the page until the allocated page is no longer allocated. In some embodiments, the pages that define portions of the same physical memory unit form a set, wherein the entries that are associated with those pages form a group, wherein each of the groups of entries of each of the state tables are stored on separate clusters of one or more additional physical memory units of the buffer memory, and further wherein the power gate controller is configured to cut power to one or more of the clusters of the additional physical memory units at times when the sets of pages associated with the groups of the entries stored on the one or more of the clusters are unallocated. In some embodiments, the buffer memory comprising a counter for each of the sets of pages, wherein the counter indicates a number of the pages of the set that are currently allocated. In some embodiments, the page state data comprises one or more of a pointer to a next page used to store a packet, a start of the packet indicator, an end of the packet indicator, a byte count, errors incurred and a number of references. In some embodiments, each of the pools comprise a plurality of memory banks.

A fifth aspect is directed to a method of reducing static power consumption within a packet processing system comprising a non-transitory computer-readable packet memory comprising a plurality of physical memory units logically divided into one or more pools and able to be independently read from or written to, wherein each of the pools is divided into a plurality of pages such that each of the pages define a separate portion of the physical memory units of the pool, a non-transitory computer-readable buffer memory comprising a separate page buffer for each of the pools, wherein each of the page buffers is filled with one or more of the pages of the associated pool, and a buffer logic coupled with the buffer memory, the method comprising for each portion of packet data that needs to be stored allocating the page that was last added within one of the page buffers to store the portion of the packet data with the buffer logic unit, remove the allocated page from the one of the page buffers with the buffer logic unit while the portion of the packet data is stored on the portion of the physical memory units defined by the allocated page and add the allocated page back into the one of the page buffers with the buffer logic unit when the portion of the packet data is no longer stored on the physical memory units defined by the allocated page. In some embodiments, packet data of incoming packets is stored on the physical memory units at the separate portions of the memory units based on the pages. In some embodiments, the buffer memory logic initially fills each of the page buffers with all of the pages of the associated pool such that the pages are grouped according to which of the physical memory units that the pages define the portion of. In some embodiments, the method further comprises cutting power to one or more of the physical memory units with a power gate controller at times when all of the pages defining the portions of the one or more of the physical memory units are currently unallocated, wherein the power gate controller is coupled with the buffer memory and each of the physical memory units. In some embodiments, the buffer memory comprises a separate page state table for each of the page buffers such that each of the page state tables is paired with a different one of the page buffers and for each of the pair, each entry of each of the state tables is associated with a different page of the pages of the page buffer that is paired with the state table of the entry and page state data of each of the allocated pages is stored in the entry associated with the page until the allocated page is no longer allocated. In some embodiments, the pages that define portions of the same physical memory unit form a set, wherein the entries that are associated with those pages form a group, wherein each of the groups of entries of each of the state tables are stored on separate clusters of one or more additional physical memory units of the buffer memory, the method further comprising cutting power to one or more of the clusters of the additional physical memory units with the power gate controller at times when the sets of pages associated with the groups of the entries stored on the one or more of the clusters are unallocated. In some embodiments, the buffer memory comprises a counter for each of the sets of pages, wherein the counter indicates a number of the pages of the set that are currently allocated. In some embodiments, the page state data comprises one or more of a pointer to a next page used to store a packet, a start of the packet indicator, an end of the packet indicator, a byte count, errors incurred and a number of references. In some embodiments, each of the pools comprise a plurality of memory banks.

A sixth aspect is directed to a method of reducing static power consumption within a packet processing system comprising a non-transitory computer-readable packet memory comprising a plurality of physical memory units logically divided into one or more pools and able to be independently read from or written to, wherein each of the pools is divided into a plurality of pages such that each of the pages define a separate portion of the physical memory units of the pool, a non-transitory computer-readable buffer memory comprising a separate page buffer for each of the pools, wherein each of the page buffers is filled with one or more of the pages of the associated pool, and a buffer logic coupled with the buffer memory, the method comprising for each portion of packet data that needs to be stored selecting one of the pools with the buffer logic unit, determining a number of the physical memory units of the selected pool that include a portion that is defined by at least one unallocated page of the pages of the page buffer associated with the selected pool with the buffer logic unit, determining which of the number of physical memory unit is ranked highest within the memory ranking for the selected pool with the buffer logic unit, allocate one of the at least one unallocated page of the physical memory unit that is ranked highest with the buffer logic unit to store the portion of the packet data, remove the allocated page from the one of the page buffers with the buffer logic unit while the portion of the packet data is stored on the portion of the physical memory unit that is ranked highest defined by the allocated page and add the allocated page back into the one of the page buffers with the buffer logic unit when the portion of the packet data is no longer stored on the portion of the physical memory unit that is ranked highest defined by the allocated page. In some embodiments, packet data of incoming packets is stored on the physical memory units at the separate portions of the memory units based on the pages. In some embodiments, the method further comprises cutting power to one or more of the physical memory units with a power gate controller at times when all of the pages defining the portions of the one or more of the physical memory units are currently unallocated, wherein the power gate controller is coupled with the buffer memory and each of the physical memory units. In some embodiments, the buffer memory comprises a separate page state table for each of the page buffers such that each of the page state tables is paired with a different one of the page buffers and for each of the pair, each entry of each of the state tables is associated with a different page of the pages of the page buffer that is paired with the state table of the entry and page state data of each of the allocated pages is stored in the entry associated with the page until the allocated page is no longer allocated. In some embodiments, the pages that define portions of the same physical memory unit form a set, wherein the entries that are associated with those pages form a group, wherein each of the groups of entries of each of the state tables are stored on separate clusters of one or more additional physical memory units of the buffer memory, and further wherein the power gate controller is configured to cut power to one or more of the clusters of the additional physical memory units at times when the sets of pages associated with the groups of the entries stored on the one or more of the clusters are unallocated. In some embodiments, the buffer memory comprising a counter for each of the sets of pages, wherein the counter indicates a number of the pages of the set that are currently allocated. In some embodiments, the page state data comprises one or more of a pointer to a next page used to store a packet, a start of the packet indicator, an end of the packet indicator, a byte count, errors incurred and a number of references. In some embodiments, each of the pools comprise a plurality of memory banks.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a packet processing system including buffer logic unit and a power gate controller. The buffer logic unit for organizing and/or allocating available pages to packets for storing the packet data based on which of a plurality of separately accessible physical memories that pages are associated with. As a result, the power gate controller is able to more efficiently cut off power from one or more of the physical memories thereby reducing static power consumption. Thus, the system provides the advantage of a cost-effective way of reducing the static power of the physical memories of the different banks that compose the packet buffer memory in a packet processing device.

Figure 1:
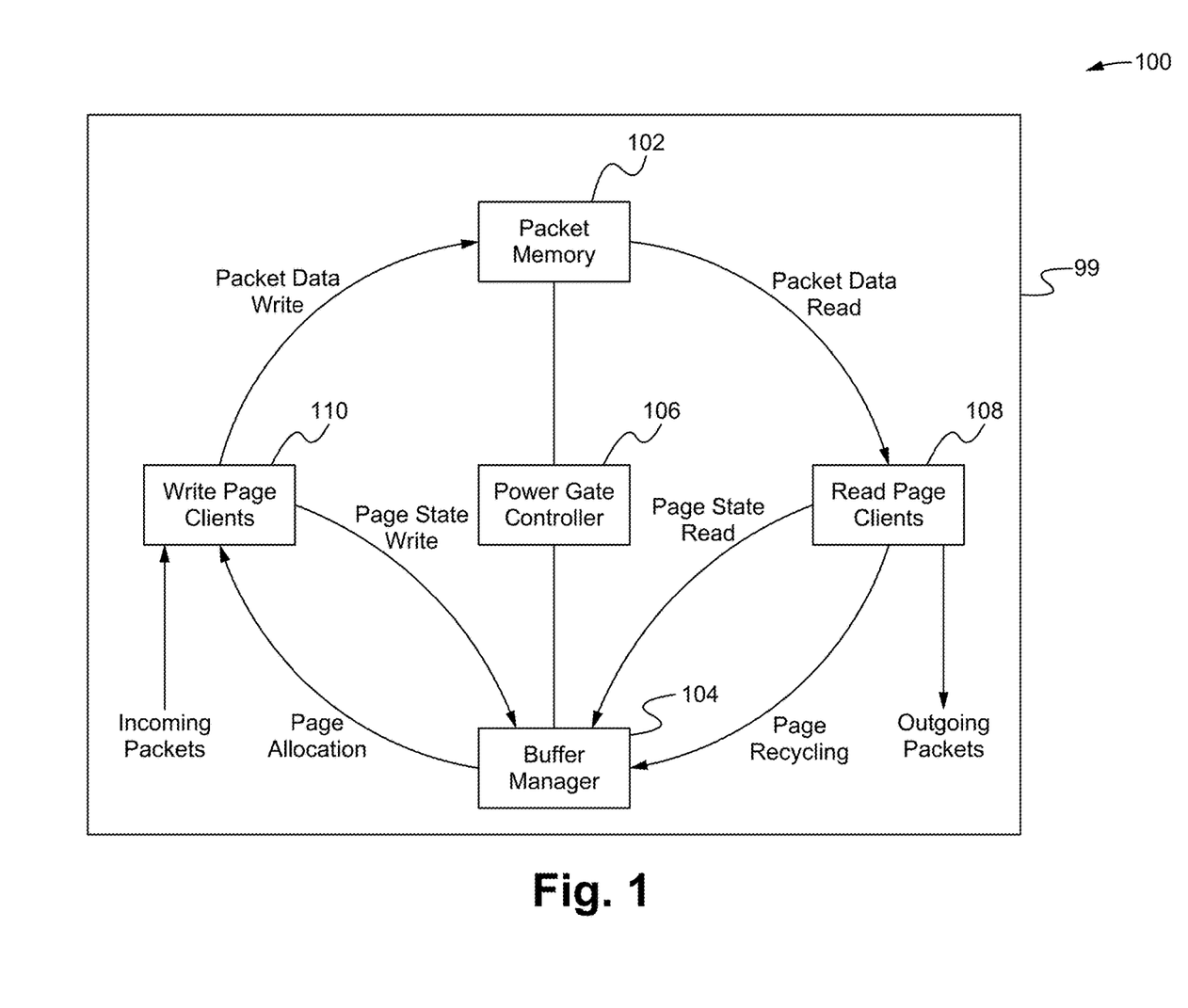
FIG. 1 illustrates a packet processing system on a packet processing device according to some embodiments.

FIG. 1 illustrates a packet processing system 100 on a packet processing device 99 according to some embodiments. As shown in FIG. 1, the packet processing system 100 comprises packet memory 102, buffer memory 104, a power gate controller 106, read page clients 108 and write page clients 110 all operably coupled together via a network. The packet processing device 99 is able to be a packet processing circuit and/or microchip. For example, the device 99 is able to be a switch microchip (e.g. top of rack switch) for a data center or other type of packet processing circuit or application specific integrated circuit. In some embodiments, the device 99 is a software defined network programmable microchip that is able to be programmed or customized to adjust the manner in which packets are processed. Alternatively, the device 99 is able to be other types of packet processing devices known in the art. In some embodiments, the power gate controller 106 is able to be incorporated into buffer logic (see FIG. 3) of the buffer manager 104. Alternatively, the power gate controller 106 is able to be independent of the buffer logic.

In operation, as the write page clients 110 receive incoming packets, the buffer manager 104 allocates unused pages of the packet memory 102 for storage of the packet data. Upon receiving the allocated page, the write page clients 110 write the packet data on the allocated page of the packet memory 102 and write page state data (based on the allocated page and the packet) back to the buffer manager 104 for storage. As a result, the buffer manager 104 is able to track which of the pages of the packet memory 102 are currently in use or unused as well as storing the page state data for all of those pages that are currently in use. At the same time, when the read page clients 108 are ready to output outgoing packets, they read the page state data associated with the outgoing packets that is stored on the buffer manager 104. Based on this page state data, the read page clients 108 are able to locate and read some or all of the packet data from the page or pages of packet memory 102 where packet data is stored. As a result, the read page clients 108 are then able to output the packet data of the outgoing packet and release the page where the packet data was read from in the packet memory 102 to the buffer manager 104 as a currently unused page that is able to reallocated when needed. Throughout this process, the power gate controller 106 is able to communicate with the buffer manager 104 and selectively cut off power to one or more portions of the packet memory 102 (and/or buffer memory of the buffer manager 104) based on the unallocated/allocated pages and/or page state data in the buffer manager 104. Accordingly, the power gate controller 106 is able to lessen the static power consumption of the device 99.

Figure 2:
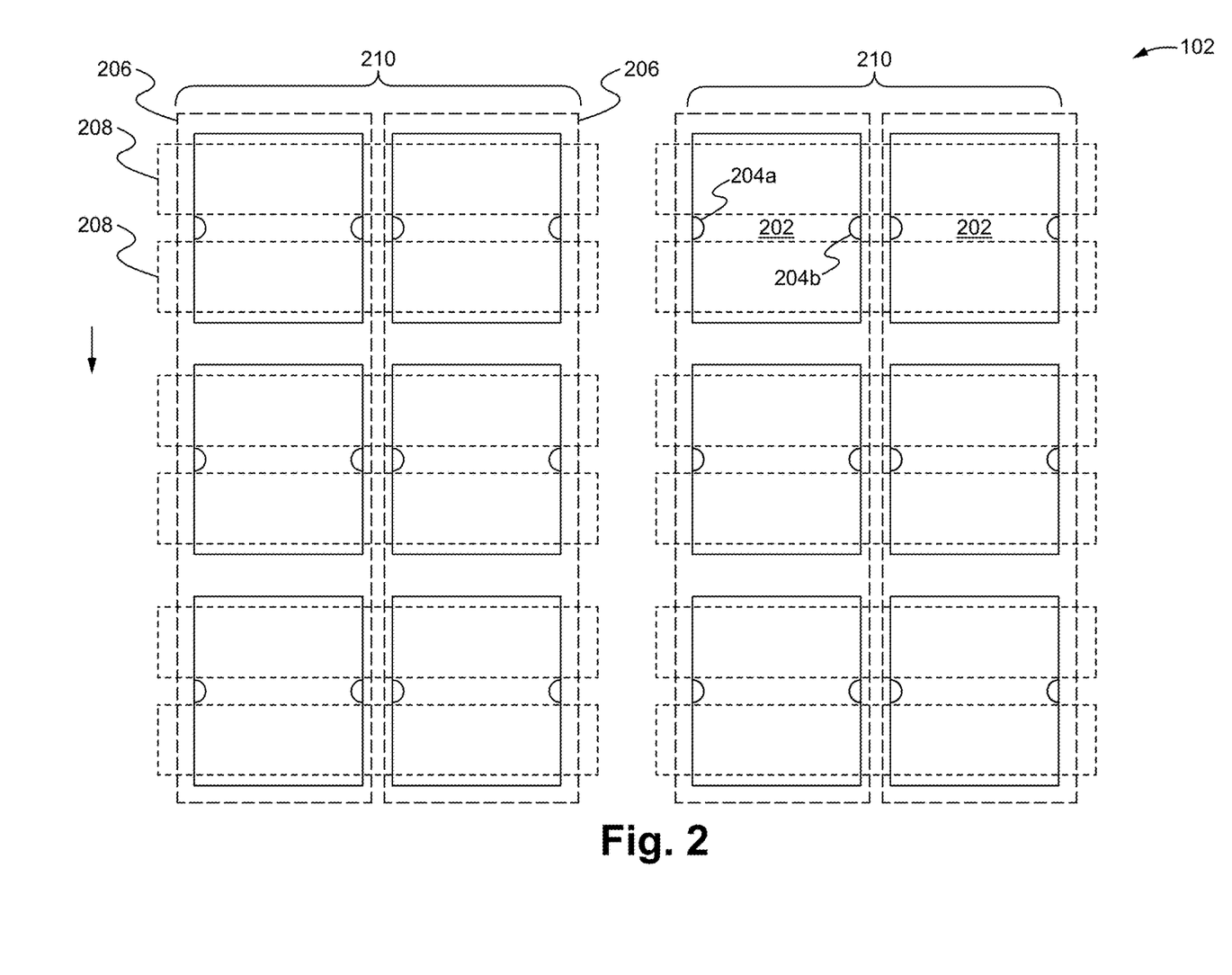
FIG. 2 illustrates a more detailed view of the packet memory according to some embodiments.

FIG. 2 illustrates a more detailed view of the packet memory 102 according to some embodiments. As shown in FIG. 2, the packet memory 102 comprises a plurality of non-transitory computer-readable physical memory units 202 each having one or more read ports 204a and one or more write ports 204b. As a result, each of the physical memory units 202 are able to independently have data written into them and/or read out from them each cycle. Indeed, although as illustrated in FIG. 2 each of the units 202 only have a single read port 204a and a single write port 204b, any number of read and/or write ports 204a, 204b are contemplated. Additionally, each of the physical memory units 202 are able to be individually cut off from power by the power controller 106. As further shown in FIG. 2, the physical memory units 202 are able to be logically organized into one or more memory banks 206 that each comprise a plurality of the units 202. Groups of one or more of these memory banks 206 are able to comprise a pool of banks 210. Although as shown in FIG. 2, each pool comprises two banks 206, one or more of the pools 210 are able to comprise more or less banks 206.

When the packet data of incoming packets is stored on the packet memory 102, it is stored on one or more pages 208. Each of these pages 208 map to a portion of one of the pools 210, and in particular, to a portion of the plurality of the memory banks 206 forming the one of the pools 210 (and therefore at least one of the physical memory units 202 of each of the plurality of banks 206). For example, as shown in FIG. 2, each of the pages 208 map to portions of two of the banks 206 and specifically to portions of two of the physical memory units 202 (one in each of the two banks 206). Alternatively, the pages 208 are able to map to portions of more banks 206 and/or memory units 202 including portions of a plurality of memory units 202 within the same bank 206. Accordingly, all of the pools 210 are logically divided or apportioned amongst a plurality of the pages 208 such that together the pages 208 map to every portion of the physical memory units 202 of the packet memory 102. As a result, when packet data is stored on a page 208, instead of being all stored sequentially in the same location, the packet data is distributed across multiple physical memory units 202 that are mapped to by the page 208. The packet memory 102, and therefore the physical memory units 202, is able to comprise a content-addressable memory (CAM), a ternary content-addressable memory (TCAM), a random access memory (RAM), a static random access memory (SRAM), other types of memory known in the art or combinations thereof.

Figure 3:
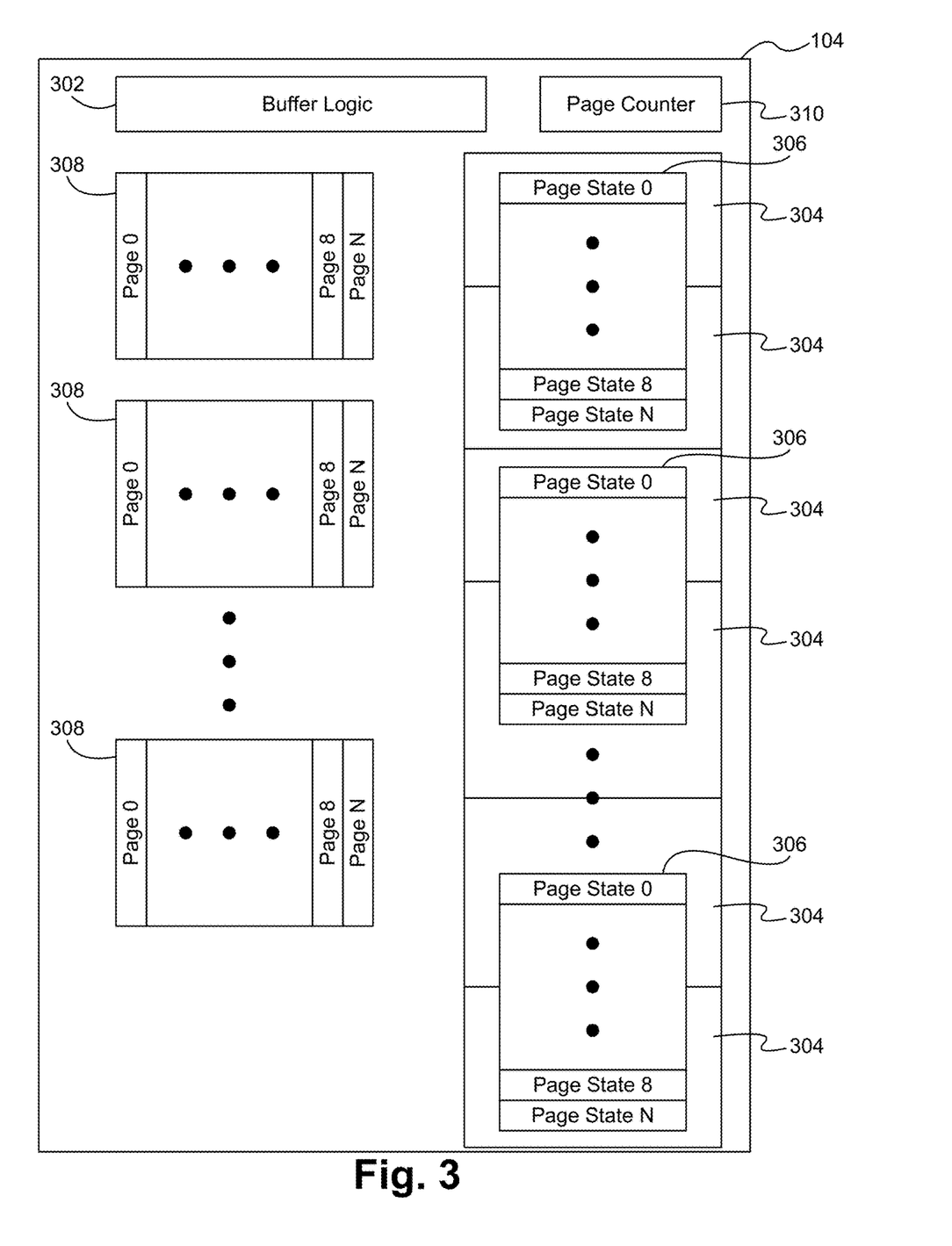
FIG. 3 illustrates the buffer manager according to some embodiments.

FIG. 3 illustrates the buffer manager 104 according to some embodiments. As shown in FIG. 3, the buffer manager 104 comprises buffer logic 302, a plurality of buffer memory units 304, one or more page state tables 306, one or more page buffers 308 and one or more page counters 310. Alternatively, the page counters 310 are able to be omitted. The buffer logic 302 implements all of the actions of the buffer manager 104 including the managing/updating of the state tables 306, the page buffers 308 and the page counters 308. The buffer logic 302 is able to comprise hardware, software or a combination of hardware and software configured to perform the buffer manager 104 functions described herein, wherein the software is stored on a non-transitory computer readable medium of the device 99.

Figure 4:
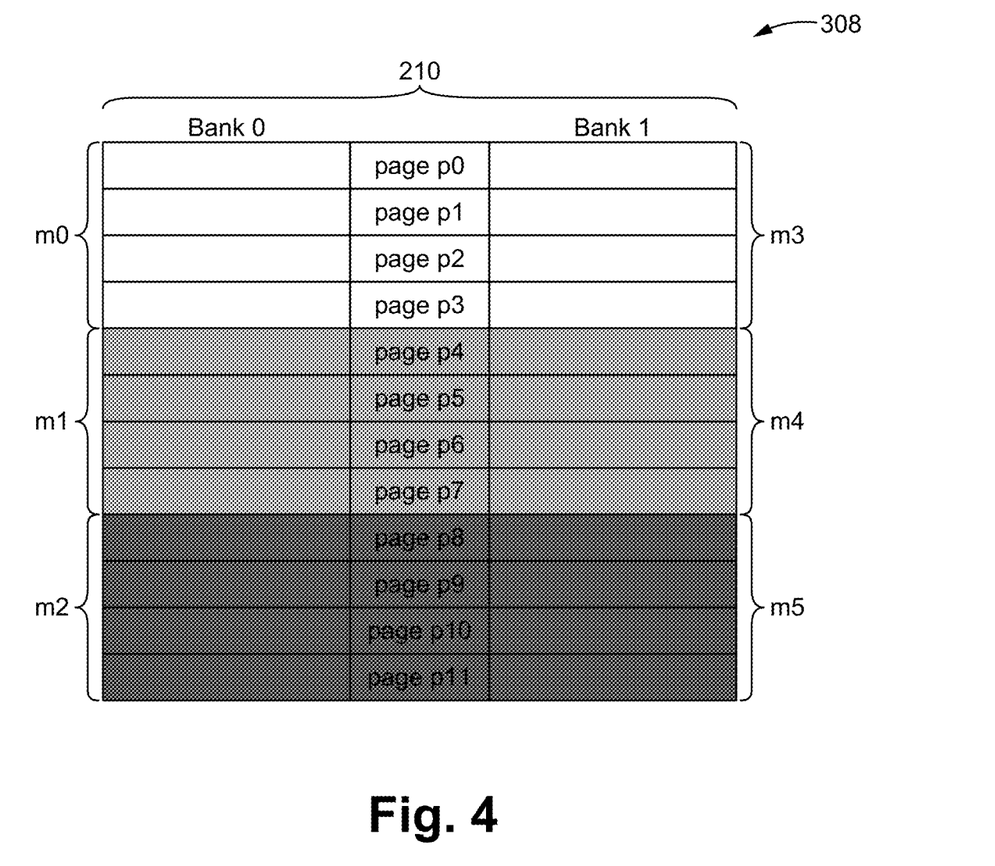
FIG. 4 illustrates an exemplary page buffer according to some embodiments.

The page buffers 308 are each associated with one of the pools 210 of the one or more banks 206 such that the buffer manager 104 is able to comprise at least one page buffer 308 for each pool 210 of the packet memory 102. FIG. 4 illustrates an exemplary page buffer 308 according to some embodiments. As shown in FIG. 4, the page buffer 308 is associated with pool 210 which includes a first memory bank 0 having the physical memory units m0, m1, m2 and a second memory bank 1 having the physical memory units m3, m4, m5. The page buffer 308 comprises twelve pages p0-p11 wherein each page 208 maps to a portion of two of the physical memory units 202. The first four pages p0-p3 map to memory units m0 and m3, the second four pages p4-p7 map to memory units m1 and m4, and the last four pages p8-p11 map to memory units m2 and m5. Because of this mapping, each of the sets of four pages are able to be considered a memory unit page set for the associated memory units. In other words, the memory unit page set p0-p3 for unit m0 (or m3) include all of the pages 208 that map to portions of that physical memory unit 202. In some embodiments, each of the memory unit page sets of a page buffer 308 are grouped together (at least initially or upon a reset) within the buffer 308 by the buffer manager 104. Alternatively, the different pages of the memory unit page sets of a page buffer 308 are able to be at least partially interleaved. Additionally, although in FIG. 4 the page buffer 308 comprises twelve pages 208 and the memory unit page sets comprise four pages 208 mapped to two physical memory units 202 each, the page buffers 308 and/or the memory unit page sets are able to comprise any number of pages 208 mapped to any number of physical memory units 202 of the pool 210 associated with the buffer 308.

Each of the page buffers 308 store all the unallocated pages 208 (or representations thereof) of the pool 210 that they are associated with. Thus, when all of the pages 208 of a pool 210 are within the associated page buffer 308 (because all the pages 208 are unallocated), it means that no packet data is currently stored on the physical memory units 202 of the banks 206 of the pool 210. When a page 208 needs to be allocated to store packet data of an incoming packet as requested by a write page client 110, the buffer manager 104 selects one of the pages 208 from one of the buffers 308 (because they are unallocated), removes it from the buffer 308 and allocates that page 208 to the write page client 110 for storing at least a portion of the packet data of the incoming packet. Subsequently, the buffer manager 104 adds the page 208 back into the same page buffer 308 when a read page client 108 indicates that the page 208 is ready to be recycled (e.g. describes a portion of the physical memory units 202 that is no longer storing any packet data). Thus, the page buffers 308 are able to dynamically indicate to the buffer manager 308 all of the currently unallocated pages 208 that are able to be selected whenever a page 208 is needed. Additionally, if the buffer indicates that all of pages 208 of a memory unit page set are unallocated, the buffer manager 104 is able to be used to determine that the associated memory unit(s) are currently not in use.

The buffer memory units 304, like the physical memory units 202, are each a non-transitory computer-readable physical memory having one or more read ports and one or more write ports (not shown). As a result, the buffer memory units 304 are able to each independently have data written into them and/or read out from them each cycle. Additionally, like the physical memory units 202, each of the buffer memory units 304 are able to be individually cut off from power by the power controller 106. The page state tables 306 are each stored on one or more of the buffer memory units 304 and are for storing page state data of each of the pages 208 when they are allocated to the packet data of a packet. Specifically, the buffer manager 104 is able to comprise a separate state table 306 for each of the page buffers 308 such that each table 306 is paired with a different one of the buffers 308.

Figure 6:
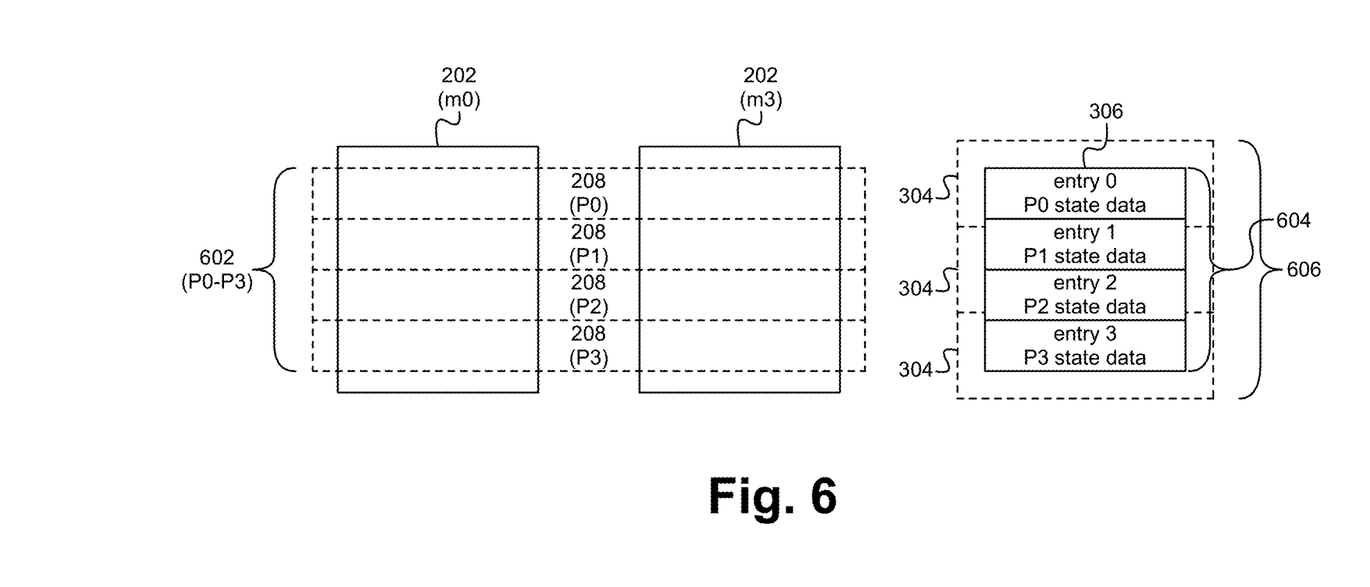
FIG. 6 illustrates an exemplary page memory set and the corresponding group of entries and cluster of buffer memory units according to some embodiments.

These state tables 306 each comprise a plurality of entries that are each associated with (or reserved for) the page state data of one of the pages 208 of the buffer 308 that is paired with the state table 306. Thus, whenever a page 208 of a buffer 308 is allocated by the buffer manager 104, the page state data of that page 208 (and the packet data to be stored on the page) is stored by the buffer manager 104 on the associated entry of the state table 306 paired with the buffer 308. Further, the entries that are associated with the pages of a memory page set (e.g. p0-p3 of FIG. 4) are able to form a group of entries that like the memory page set are associated with particular physical memory units 202 (e.g. m0 and m3 of FIG. 4). Finally, the one or more buffer memory units 304 that store one of these groups of entries are able to be labeled a cluster, wherein the cluster (of buffer memory units 304) is also able to be associated with the particular physical memory units 202 (e.g. m0 and m3 of FIG. 4). In this way, physical memory units 202, sets of pages 208, groups of entries of state tables 306 and clusters of buffer memory units 304 are all able to be associated with each other. For example, as shown in FIG. 6, the pages 208 (p0-p3) mapped to two memory units 202 (m0, m3) form a memory page set 602. Further, each of those pages 208 (p0-p3) have a corresponding entry (entry 0-entry 3) of one of the state tables 306, wherein those entries form a group of entries 604 that correspond to the memory page set 602 and the memory units 202 (m0, m3). Finally, the three buffer memory units 304 upon which the group of entries 604 is stored forms a cluster 606 that similarly is associated with not only the group 604, but also the memory page set 602 and the memory units 202 (m0, m3). As a result, the characteristics (e.g. is data present, are the pages available) of either the set 602 and/or the group 604 is able to be used to determine if the memory units 202 (m0, m3) and/or the cluster 606 is currently in use or could be powered off.

The page state data is able to comprise one or more of: a pointer to a next page 208 of the link list of pages 208 used to store a packet, a start of the packet indicator on the page 208, an end of the packet indicator on the page 208, a byte count of the packet data, errors incurred within the packet data, a number of references (for multicast or broadcast packets), and/or other types of packet/page data known in the art. Subsequently, when a read page client 108 needs to read the packet data stored on a page 208, the buffer manager 104 and/or read page client 108 reads out the page state data from the entry associated with the page 208 and indicates that the page 208 is free to be recycled back into the paired page buffer 308 by the buffer manager 104. Although as shown in FIG. 3, each table 306 is stored on two buffer memory units 304, each table 306 is able to be stored on more or less buffer memory units 304.

The page counters 310 are utilized by the buffer manager 104 to dynamically store/update a page buffer value indicating when one or more of the physical memory units 202 are not currently being used to store any packet data. In other words, the page counters 310 are able to indicate when all of the pages 208 that map to a physical memory unit 202 are unallocated (such that any associated the physical memory units 202 are currently unused). To do so, for each page buffer 308, the associated page counters 310 track how many of the pages 208 of each memory unit page set of pages are currently within the page buffer 308 (i.e. how many of the pages 208 of the set are currently unallocated). Based on this, as described above, the buffer manager 104 is able to determine if a physical memory unit 202 is currently in use because at least one of the pages 208 of the associated memory unit page set is allocated or not currently in used because all of the pages 208 of the associated memory unit page set are unallocated. In some embodiments, there is a separate page counter 310 for each memory unit page set of each page buffer 308. Alternatively, one or more of the page counters 310 are able to track a number of allocate/unallocated pages 208 of a plurality of the sets.

Further, alternatively or in addition to the page buffer values, the page counters 310 are able to dynamically store a table value indicating when one or more of the physical memory units 202 are not currently being used to store any packet data. In particular, as described above, each page 208 of a page buffer 308 is associated with an entry of a corresponding state table 306, wherein when a page 208 is allocated, the page state data for that page 208 is stored in the associated entry. Therefore, for each memory unit page set of pages 208, there is a corresponding group of entries that are associated with the pages of the memory unit page set. Accordingly, similar to the buffer values, the page counters 310 are able to include the table values wherein when the table values indicate that all of a group of entries of a table 306 are empty (i.e. not storing any state data), the buffer manager 104 is able to determine that the physical memory units 202 associated with the group of entries (via the corresponding memory unit page set) are not currently being used. In such embodiments, there is a separate page counter 310 for each group of entries of each table 306. Alternatively, one or more of the page counters 310 are able to track a number of allocate/unallocated pages 208 of a plurality of the groups. In some embodiments, the buffer logic 302 of the buffer manager 104 arranges the entries on the buffer memory units 304 such that entries belonging to the same group are stored on the same one or more memory units 304.

Additionally, as shown in FIG. 3, the entries of the tables 306 are located on one or more buffer memory units 304. As a result, the buffer manager 104 is also able to use the table values to determine when one or more of the buffer memory units 304 are not storing any data based on if all of the entries located on the buffer memory units 204 are empty. Similarly, if the buffer values indicate that a set of pages 208 is unallocated, the buffer manager 104 is able to determine that the buffer memory units 204 storing the corresponding group of entries is unused. Therefore, based on either the buffer value, the table value or both for any set of pages 208 or group of entries, the buffer manager 104 is able to determine whether and which of the physical memory units 202 and/or buffer memory units 304 are currently not storing any packet data or page state data (such that they are able to be safely power gated off).

The power gate controller 106 is coupled with each of the physical memory units 202 and/or each of the buffer memory units 304. As a result, the power gate controller 106 is able to selectively block and restore power or voltage to one or more of the units 202 and/or 304 such that when blocked they receive zero power or voltage and effectively have a static power consumption of zero. This selective blocking is able to be based on the buffer and/or state values of the counters 310, wherein the power gate controller 106 cuts off power to each physical memory unit 202 and/or buffer memory unit 304 when the buffer and/or state values indicate that the physical memory unit 202 and/or buffer memory unit 304 is not storing packet data and/or page state data. For example, as described above, based on the buffer values the power gate controller 106 is able to cut off power to the associated physical memory units 202 and/or the corresponding buffer memory units 304. As another example, as described above, based on the state values the power gate controller 106 is able to cut off power to the associated buffer memory units 304 and/or the corresponding physical memory units 202. Additionally, the power gate controller 106 is able to restore power to each physical memory unit 202 and/or buffer memory unit 304 when the buffer and/or state values indicate that the physical memory unit 202 and/or buffer memory unit 304 is needed to store incoming packet data and/or page state data. The power gate controller 106 is able to comprise hardware, software or a combination of hardware and software, wherein the software is stored on a non-transitory computer readable medium of the device 99. Further, it should be noted that in some embodiments the buffer memory units 304 are smaller than the physical memory units 202 such that each group of entries is able to be stored on the plurality of buffer memory units 304. In such cases, even if only a portion of the entries of a group are empty, if that portion of entries are all stored on the same buffer memory unit 304 the power gate controller 106 is able to cut off power to that buffer memory unit 304. This is the case even though the power gate controller 106 cannot cut off power to all of the buffer memory units 304 of the group and therefore cannot cut off power to the physical memory units 202 of the memory unit page set that corresponds to the group.

In operation, unlike traditional buffer managers, the buffer logic 302 of the buffer manager 104 initially, upon a reset and/or periodically populates each of the page buffers 308 such that each of the memory unit page sets of a page buffer 308 are grouped together within the buffer 308 by the buffer manager 104. As a result, the order in which the pages 208 are added to the buffer 308 will be all of the pages 208 of a first set, followed by all of the pages 208 of a second set and so on until all of the pages 208 from all of the sets have been added to the buffer 308. The buffer manager 104 is also able to locate/assign/position each of the entries of the state tables 306 on the buffer memory units 304 such that entries of a state table 306 are grouped together on one or more buffer memory units 304. Subsequently, when pages 208 are requested for use by one or more write page clients 110, also unlike traditional buffer managers, the buffer logic 302 of the buffer manager 104 is able to utilize a last in first out (LIFO) policy when selecting which page 208 of a page buffer 308 to allocate to each write page client 110 for storing the packet data. In other words, for each page buffer 308 the buffer manager 104 monitors the order in which the pages 208 were added to the buffer 308 and always selects the page 208 that was most recently added (e.g. the last page added). In some embodiments, this monitoring is able to be adding the pages 208 to the open slots of the buffers 308 in a particular order such that the slot where a page 208 is located will indicate if it was the last added page 208 to the buffer 308. Alternatively, other order monitoring methods are able to be used. In any case, as a result of this LIFO policy, the pages 208 that were added to the buffer 308 earlier are not used unless more pages 208 are needed before the pages 208 that were added last (which were the first to have been allocated) have had time to be returned to the buffer 308.

Further, because as described above the pages 208 are added to the buffers 308 in order as sets, like the individual pages 208 the sets that were added to each page buffer 308 earlier are not used unless more sets are needed before the pages 208 of the sets that were added last (which were the first to have been allocated) have had time to be returned to the buffer 308. This is important because, as described above, each memory unit page set is associated with one or more physical memory units 202. Therefore, because the use of the LIFO policy by the buffer manager 104 results in the selection or prioritization of the later added sets over the earlier added sets, it simultaneously results in the selection or prioritization of the physical memory units 202 associated with the later added sets being prioritized for use over the physical memory units 202 associated with earlier added sets. In this way, the buffer manager 104 is able to minimize the use of the physical memory units 202 associated with the earlier added sets. Additionally, because the groups of entries associated with the sets of pages only store page state data when the sets of pages are allocated, the buffer manager 104 is also minimizing the use of the buffer memory units 304 for storing pages state data of the groups of entries associated with the pages 208 of earlier added sets.

Alternatively, in some embodiments the buffer logic 302 of the buffer manager 104 is able to assign a priority or rank to each of the memory unit page sets of each of the page buffers 308 (and thus each of the corresponding groups of entries of the state tables 306). In this way, the buffer manager 104 is essentially assigning a rank or priority to each of the physical memory units 202 associated with the memory unit page sets (as well as the buffer memory units 304 associated with the corresponding groups of entries). Subsequently, when pages 208 are requested for use by one or more write page clients 110, also unlike traditional buffer managers, the buffer logic 302 of the buffer manager 104 is able to utilize the ranking/prioritization of the sets when selecting which page 208 of a page buffer 308 to allocate to each write page client 110 for storing the packet data. In other words, for each page buffer 308 the buffer manager 104 checks the associated ranking/prioritization and of the sets having unallocated pages 208 always selects a page 208 from the set with the highest ranking/prioritization. Therefore, like the LIFO policy and initial placement described above, the use of the ranking/prioritization by the buffer manager 104 results in a minimization of the use of the lower ranked physical memory units 202 and/or buffer memory units 304.

At the same time, the power gate controller 106 monitors each of the sets within each of the buffers 308 via the page counters 310 and cuts off (and restore) power to one or more of the physical memory units 202 and/or buffer memory units 304 when they are not being used based on the sets of pages 208 that are unallocated within the page buffers 308 and/or the groups of entries that are empty within the state tables 306. In some embodiments the power gate controller 106 determines when one or more of the physical memory units 202 and/or buffer memory units 304 are not in use based on the buffer values within one or more of the counters 310 which indicate when all the pages 208 of a set are unallocated. Alternatively, in some embodiments the power gate controller 106 determines when one or more of the physical memory units 202 and/or buffer memory units 304 are not in use based on the state values (or both the state and buffer values) within one or more of the counters 310.

Alternatively, one or more of the page counters 310 are able to be omitted and the power gate controller 106 is able to use other methods to determine when one or more of the physical memory units 202 are not being used based on the pages 208 of the page buffers 308 and/or entries of the groups. In any case, by minimizing the use of the physical memory units 202 and/or the buffer memory units 304 via the LIFO policy and the initial ordering of pages 208 within the buffers 308 and/or the groups on the buffer memory units 304, the buffer manager 104 increases the amount of time and the frequency that the power gate controller 106 is able to cut off power to one or more of the physical memory units 202 and/or buffer memory units 304 (in particular the units 202 associated with the earlier added sets and the units 304 wherein the corresponding groups are located).

Figure 5:
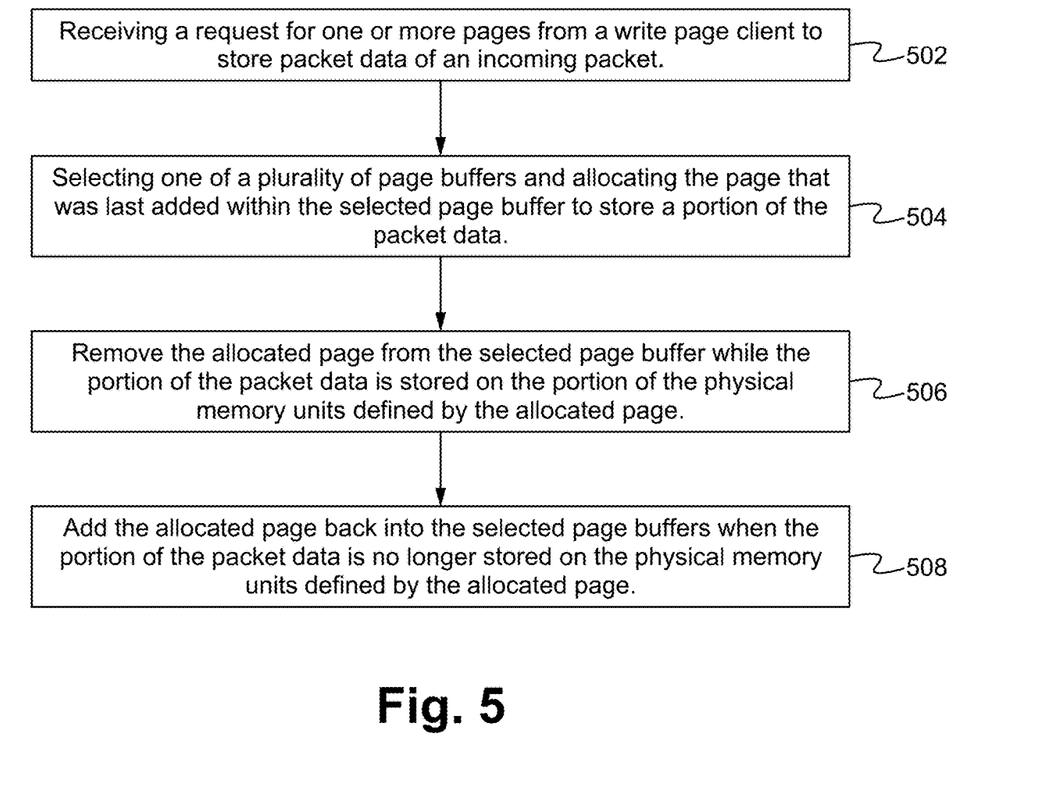
FIG. 5 illustrates a method of reducing static power of a packet processing system according to some embodiments.

FIG. 5 illustrates a method of reducing static power of a packet processing system 100 according to some embodiments. As shown in FIG. 5, the buffer manager 104 receives a request for one or more pages 208 from a write page client 110 to store packet data of an incoming packet at the step 502. The buffer manager 104 then selects one of a plurality of page buffers 308 and allocates the page 208 that was last added within the selected page buffer 308 to store a portion of the packet data at the step 504. Alternatively, the method is able to comprise, for each of the page buffers 308, serially ranking the memory unit page sets that are included within the page buffer 308. In particular, in such embodiments instead of allocating the last added page 208 within the selected page buffer 308, the buffer manager 104 allocates pages 208 of the selected page buffer 308 according to the serial ranking of the memory unit page sets of the page buffer 308 such that a page 208 of the highest ranked memory unit page set having unallocated pages 208 is selected before pages 208 from any lower ranking memory unit page set having unallocated pages 208. The buffer manager 104 removes the allocated page 208 from the selected page buffer 308 while the portion of the packet data is stored on the portion of the physical memory units 202 defined by the allocated page 208 at the step 506. The buffer manager 104 adds the allocated page 208 back into the selected page buffer 308 when the portion of the packet data is no longer stored on the physical memory units 202 defined by the allocated page 208 at the step 508. In some embodiments, the method further comprises the buffer manager 104 initially, periodically or upon a reset organizing the pages 208 within each of the page buffers 308 (and/or the entries of the state tables 306) such that memory unit page sets (and/or groups of entries) are next to each other in the sequence of pages 208 within the page buffer 308 (and/or on the buffer memory units 304 storing the state table 306). In some embodiments, the method further comprises the power gate controller 106 cutting power to one or more of the physical memory units 202 and/or the buffer memory units 304 at times when all of the pages 208 defining the portions of the one or more of the physical memory units 202 are currently unallocated and/or all the entries located on the buffer memory units 304 are empty. In such embodiments, the power gate controller 106 is able to determine those times based on the buffer values and/or the state values of the page counters 310. As a result, the method provides the advantage of reducing static power consumption by maximizing the time when physical memory units 202 and/or buffer memory units 304 are not in use such that they are able to be cut off from their power source via the power gate controller 106.

The packet processing system described herein has numerous advantages. In particular, the system provides the advantage of a cost-effective way of reducing the static power of the physical memories of the different banks that compose the packet buffer memory in a packet processing device. In particular, the system groups the free pages that map to the same memory units and enables the power gating of the memory units that do not have any page currently active in the switch device and therefore saving static power. Thus, the system increases the power efficiency of the switch thereby lowering the switch costs.

While the invention has been described with reference to numerous specific details, one of ordinary skill in the art will recognize that the invention can be embodied in other specific forms without departing from the spirit of the invention. For example, although the different methods and operations described herein describe a particular order of steps, other orders are contemplated as well as the omission of one or more of the steps and/or the addition of one or more new steps. Moreover, although the methods and operations above are described herein separately, one or more of the methods and operations are able to be combined (in whole or part). Thus, one of ordinary skill in the art will understand that the invention is not to be limited by the foregoing illustrative details, but rather is to be defined by the appended claims.

I claim:

1. A packet processing system comprising:
a non-transitory computer-readable packet memory comprising a plurality of physical memory units logically divided into a plurality of pages such that each of the pages is associated with a separate portion of one or more of the physical memory units;
a non-transitory computer-readable buffer memory comprising one or more page buffers, wherein each of the page buffers is filled with one or more of the pages; and
a buffer memory logic coupled with the buffer memory, wherein for each portion of packet data that needs to be stored, the buffer memory logic is configured to:
allocate a page of the plurality of pages that was last added within one of the page buffers to store the portion of the packet data;
identify the allocated page as in use while the portion of the packet data is stored on the portion of the physical memory units associated with the allocated page; and
identify the allocated page as available when the portion of the packet data is no longer stored on the physical memory units associated with the allocated page.

2. The system of claim 1, wherein packet data of incoming packets is stored on the physical memory units at the separate portions of the memory units based on the pages.

3. The system of claim 2, wherein the buffer memory logic initially fills each of the page buffers with the pages such that the pages are grouped according to the portion of the plurality of the physical memory units associated with the pages.

4. The system of claim 3, further comprising a power gate controller coupled with the buffer memory and each of the physical memory units, wherein the power gate controller is configured to cut power to one or more of the physical memory units in response to all of the pages defining the portions of the one or more of the physical memory units becoming unallocated.

5. The system of claim 4, wherein:
the buffer memory comprises a separate page state table for each of the page buffers such that each of the page state tables is paired with a different one of the page buffers and for each of the pair;
each entry of each of the page state tables is associated with a different page of the pages of the page buffer that is paired with the page state table of the entry; and
page state data of each of the allocated pages is stored in the entry associated with the page until the allocated page is no longer allocated.

6. The system of claim 5, wherein the pages that are associated with portions of the same physical memory unit form a set, wherein the entries that are associated with those pages form a group, wherein each of the groups of entries of each of the page state tables are stored on separate clusters of one or more additional physical memory units of the buffer memory, and further wherein the power gate controller is configured to cut power to one or more of the clusters of the additional physical memory units in response to the sets of pages associated with the groups of the entries stored on the one or more of the clusters becoming unallocated.

7. The system of claim 6, wherein the buffer memory comprises a counter for each of the sets of pages, wherein the counter indicates a number of the pages of the set that are currently allocated.

8. The system of claim 7, wherein the page state data comprises one or more of a pointer to a next page used to store a packet, a start of a packet indicator, an end of the packet indicator, a byte count, errors incurred and a number of references.

9. A packet processing system comprising:
a non-transitory computer-readable packet memory comprising a plurality of physical memory units logically divided into one or more pools, wherein each of the physical memory units of each of the one or more pools is ranked within a memory ranking with respect to each other of the physical memory units of the pool, wherein each of the pools is divided into a plurality of pages such that each of the pages define a separate portion of the physical memory units of the pool;
a non-transitory computer-readable buffer memory comprising a separate page buffer for each of the pools, wherein each of the page buffers is filled with one or more of the pages of the associated pool; and
a buffer memory logic coupled with the buffer memory.

10. The system of claim 9, wherein packet data of incoming packets is stored on the physical memory units at the separate portions of the memory units based on the pages.

11. The system of claim 10, further comprising a power gate controller coupled with the buffer memory and each of the physical memory units, wherein the power gate controller is configured to cut power to one or more of the physical memory units in response to all of the pages defining the portions of the one or more of the physical memory units are becoming unallocated.

12. The system of claim 11, wherein:
the buffer memory comprises a separate page state table for each of the page buffers such that each of the page state tables is paired with a different one of the page buffers;
each entry of each of the page state tables is associated with a different page of the pages of the page buffer that is paired with the page state table of the entry; and
page state data of each of the allocated pages is stored in the entry associated with the page until the allocated page is no longer allocated.

13. The system of claim 12, wherein the pages that define portions of the same physical memory unit form a set, wherein the entries that are associated with those pages form a group, wherein each of the groups of entries of each of the page state tables are stored on separate clusters of one or more additional physical memory units of the buffer memory, and further wherein the power gate controller is configured to cut power to one or more of the clusters of the additional physical memory units in response to the sets of pages associated with the groups of the entries stored on the one or more of the clusters becoming unallocated.

14. The system of claim 13, wherein the buffer memory comprising a counter for each of the sets of pages, wherein the counter indicates a number of the pages of the set that are currently allocated.

15. The system of claim 14, wherein the page state data comprises one or more of a pointer to a next page used to store a packet, a start of a packet indicator, an end of the packet indicator, a byte count, errors incurred and a number of references.

16. The system of claim 15, wherein each of the pools comprise a plurality of memory banks.

17. A buffer logic unit stored on a non-transitory computer-readable medium, the non-transitory computer-readable comprising a plurality of physical memory units logically divided into a plurality of pages such that each of the pages is associated with a separate portion of the physical memory units of the pool, and a buffer memory comprising one or more page buffers, wherein each of the page buffers is filled with one or more of the pages and for each portion of packet data that needs to be stored, the buffer memory logic is configured to:
allocate a page of the plurality of pages that was last added within one of the page buffers to store the portion of the packet data;
identify the allocated page as in use while the portion of the packet data is stored on the portion of the physical memory units associated with the allocated page; and
identify the allocated page as available when the portion of the packet data is no longer stored on the physical memory units associated with the allocated page.

18. The buffer logic unit of claim 17, wherein packet data of incoming packets is stored on the physical memory units at the separate portions of the memory units based on the pages.

19. The buffer logic unit of claim 18, wherein the buffer memory logic initially fills each of the page buffers with the pages such that the pages are grouped according to the portion of the plurality of the physical memory units associated with the pages.

20. The buffer logic unit of claim 19, further comprising a power gate controller coupled with the buffer memory and each of the physical memory units, wherein the power gate controller is configured to cut power to one or more of the physical memory units in response to all of the pages defining the portions of the one or more of the physical memory units becoming unallocated.

21. The buffer logic unit of claim 20, wherein:
the buffer memory comprises a separate page state table for each of the page buffers such that each of the page state tables is paired with a different one of the page buffers and for each of the pair;
each entry of each of the page state tables is associated with a different page of the pages of the page buffer that is paired with the page state table of the entry; and
page state data of each of the allocated pages is stored in the entry associated with the page until the allocated page is no longer allocated.

22. The buffer logic unit of claim 21, wherein the pages that are associated with portions of the same physical memory unit form a set, wherein the entries that are associated with those pages form a group, wherein each of the groups of entries of each of the page state tables are stored on separate clusters of one or more additional physical memory units of the buffer memory, and further wherein the power gate controller is configured to cut power to one or more of the clusters of the additional physical memory units in response to the sets of pages associated with the groups of the entries stored on the one or more of the clusters becoming unallocated.

23. The buffer logic unit of claim 22, wherein the buffer memory comprises a counter for each of the sets of pages, wherein the counter indicates a number of the pages of the set that are currently allocated.

24. The buffer logic unit of claim 23, wherein the page state data comprises one or more of a pointer to a next page used to store a packet, a start of a packet indicator, an end of the packet indicator, a byte count, errors incurred and a number of references.

25. A buffer logic unit stored on a non-transitory computer-readable medium, the non-transitory computer-readable comprising a plurality of physical memory units logically divided into one or more pools, wherein each of the physical memory units of each of the one or more pools is ranked within a memory ranking with respect to each other of the physical memory units of the pool, wherein each of the pools is divided into a plurality of pages such that each of the pages define a separate portion of the physical memory units of the pool, and a buffer memory comprising a separate page buffer for each of the pools, wherein each of the page buffers is filled with one or more of the pages of the associated pool, the buffer logic unit coupled with the buffer memory.

26. The buffer logic unit of claim 25, wherein packet data of incoming packets is stored on the physical memory units at the separate portions of the memory units based on the pages.

27. The buffer logic unit of claim 26, further comprising a power gate controller coupled with the buffer memory and each of the physical memory units, wherein the power gate controller is configured to cut power to one or more of the physical memory units in response to all of the pages defining the portions of the one or more of the physical memory units becoming are unallocated.

28. The buffer logic unit of claim 27, wherein:
the buffer memory comprises a separate page state table for each of the page buffers such that each of the page state tables is paired with a different one of the page buffers;
each entry of each of the page state tables is associated with a different page of the pages of the page buffer which is paired with the page state table of that entry; and
page state data of each of the allocated pages is stored in the entry associated with the page until the allocated page is no longer allocated.

29. The buffer logic unit of claim 28, wherein the pages that define portions of the same physical memory unit form a set, wherein the entries that are associated with those pages form a group, wherein each of the groups of entries of each of the page state tables are stored on separate clusters of one or more additional physical memory units of the buffer memory, and further wherein the power gate controller is configured to cut power to one or more of the clusters of the additional physical memory units in response to the sets of pages associated with the groups of the entries stored on the one or more of the clusters becoming unallocated.

30. The buffer logic unit of claim 29, wherein the buffer memory comprising a counter for each of the sets of pages, wherein the counter indicates a number of the pages of the set that are currently allocated.

31. The buffer logic unit of claim 30, wherein the page state data comprises one or more of a pointer to a next page used to store a packet, a start of a packet indicator, an end of the packet indicator, a byte count, errors incurred and a number of references.

32. The buffer logic unit of claim 31, wherein each of the pools comprise a plurality of memory banks.

33. A method of reducing static power consumption within a packet processing system comprising a non-transitory computer-readable packet memory comprising a plurality of physical memory units logically divided into a plurality of pages such that each of the pages is associated with a separate portion of the physical memory units, a non-transitory computer-readable buffer memory comprising one or more page buffers, wherein each of the page buffers is filled with one or more of the pages, and a buffer logic coupled with the buffer memory, the method comprising:
for each portion of packet data that needs to be stored:
allocating a page of the plurality of pages that was last added within one of the page buffers to store the portion of the packet data with the buffer logic unit;
identify the allocated page as in use while the portion of the packet data is stored on the portion of the physical memory units associated with the allocated page; and
identify the allocated page as available when the portion of the packet data is no longer stored on the physical memory units associated with the allocated page.

34. The method of claim 33, wherein packet data of incoming packets is stored on the physical memory units at the separate portions of the memory units based on the pages.

35. The method of claim 34, wherein the buffer memory logic initially fills each of the page buffers with the pages such that the pages are grouped according to the portion of the plurality of the physical memory units associated with the pages.

36. The method of claim 35, further comprising cutting power to one or more of the physical memory units with a power gate controller in response to all of the pages defining the portions of the one or more of the physical memory units becoming unallocated, wherein the power gate controller is coupled with the buffer memory and each of the physical memory units.

37. The method of claim 36, wherein:
the buffer memory comprises a separate page state table for each of the page buffers such that each of the page state tables is paired with a different one of the page buffers and for each of the pair;
each entry of each of the page state tables is associated with a different page of the pages of the page buffer that is paired with the page state table of the entry; and
page state data of each of the allocated pages is stored in the entry associated with the page until the allocated page is no longer allocated.

38. The method of claim 37, wherein the pages that are associated with portions of the same physical memory unit form a set, wherein the entries that are associated with those pages form a group, wherein each of the groups of entries of each of the page state tables are stored on separate clusters of one or more additional physical memory units of the buffer memory, the method further comprising cutting power to one or more of the clusters of the additional physical memory units with the power gate controller in response to the sets of pages associated with the groups of the entries stored on the one or more of the clusters becoming unallocated.

39. The method of claim 38, wherein the buffer memory comprises a counter for each of the sets of pages, wherein the counter indicates a number of the pages of the set that are currently allocated.

40. The method of claim 39, wherein the page state data comprises one or more of a pointer to a next page used to store a packet, a start of a packet indicator, an end of the packet indicator, a byte count, errors incurred and a number of references.

41. A method of reducing static power consumption within a packet processing system comprising a non-transitory computer-readable packet memory comprising a plurality of physical memory units logically divided into one or more pools, wherein each of the physical memory units of each of the one or more pools is ranked within a memory ranking with respect to each other of the physical memory units of the pool, wherein each of the pools is divided into a plurality of pages such that each of the pages define a separate portion of the physical memory units of the pool, a non-transitory computer-readable buffer memory comprising a separate page buffer for each of the pools.

42. The method of claim 41, wherein packet data of incoming packets is stored on the physical memory units at the separate portions of the memory units based on the pages.

43. The method of claim 42, further comprising cutting power to one or more of the physical memory units with a power gate controller in response to all of the pages defining the portions of the one or more of the physical memory units becoming unallocated, wherein the power gate controller is coupled with the buffer memory and each of the physical memory units.

44. The method of claim 43, wherein:
the buffer memory comprises a separate page state table for each of the page buffers such that each of the page state tables is paired with a different one of the page buffers and for each of the pair;
each entry of each of the page state tables is associated with a different page of the pages of the page buffer that is paired with the page state table of the entry; and
page state data of each of the allocated pages is stored in the entry associated with the page until the allocated page is no longer allocated.

45. The method of claim 44, wherein the pages that define portions of the same physical memory unit form a set, wherein the entries that are associated with those pages form a group, wherein each of the groups of entries of each of the page state tables are stored on separate clusters of one or more additional physical memory units of the buffer memory, and further wherein the power gate controller is configured to cut power to one or more of the clusters of the additional physical memory units in response to the sets of pages associated with the groups of the entries stored on the one or more of the clusters becoming unallocated.

46. The method of claim 45, wherein the buffer memory comprising a counter for each of the sets of pages, wherein the counter indicates a number of the pages of the set that are currently allocated.

47. The method of claim 46, wherein the page state data comprises one or more of a pointer to a next page used to store a packet, a start of a packet indicator, an end of the packet indicator, a byte count, errors incurred and a number of references.

48. The method of claim 47, wherein each of the pools comprise a plurality of memory banks.

49. The system of claim 1, wherein the buffer memory logic allocates the page of the plurality of pages that was last added within the one of the page buffers such that the allocated page of the plurality of pages is the page within the one of the page buffers that has been in the one of the page buffers for the shortest amount of time out of all of the pages currently within the one of the page buffers.

* * * * *